(12) United States Patent
Meyer

(10) Patent No.: US 6,170,747 B1
(45) Date of Patent: Jan. 9, 2001

(54) APPARATUS FOR INSPECTING PRINT QUALITY OF BARCODES ON A HIGH SPEED MOVING WEB

(76) Inventor: Jacob P. Meyer, 45 Terry St., Sayville, NY (US) 11782

( * ) Notice: Under 35 U.S.C. 154(b), the term of this patent shall be extended for 0 days.

(21) Appl. No.: 08/919,945

(22) Filed: Aug. 29, 1997

(51) Int. Cl.[7] .................................................. G06K 7/00
(52) U.S. Cl. ...................... 235/436; 235/476; 250/559.44
(58) Field of Search .................... 235/436, 376, 235/439, 476, 485, 495, 462.01; 250/234, 235, 236, 559.44, 559.45, 559.48

(56) References Cited

U.S. PATENT DOCUMENTS

| | | | |
|---|---|---|---|
| 3,446,978 | 5/1969 | Leavens, Jr. | 250/219 |
| 3,593,028 | 7/1971 | Lehtinen | 250/219 |
| 3,612,702 | 10/1971 | Troll | 356/200 |
| 3,618,063 | 11/1971 | Johnson | 340/259 |
| 3,783,293 | 1/1974 | Gold et al. | 250/548 |
| 3,804,404 | 4/1974 | Bosshard | 271/57 |
| 3,919,560 | 11/1975 | Nopper | 250/557 |
| 4,013,367 | 3/1977 | Nagao et al. | 356/200 |
| 4,067,760 | 1/1978 | Nelson | 156/157 |
| 4,139,307 | 2/1979 | Clarke | 356/446 |
| 4,363,271 | 12/1982 | Horst | 101/181 |
| 4,557,786 | 12/1985 | Stock et al. | 156/350 |
| 4,600,841 | 7/1986 | Tokuno et al. | 250/548 |
| 4,673,803 * | 6/1987 | Zerle et al. | 235/436 |
| 4,683,380 | 7/1987 | Shipkowski et al. | 250/548 |
| 4,699,531 * | 10/1987 | Ulinski, Sr. et al. | 400/74 |
| 4,728,784 * | 3/1988 | Stewart | 235/436 |
| 4,868,403 | 9/1989 | Takahashi et al. | 250/563 |
| 5,008,520 * | 4/1991 | Georgiou et al. | 235/449 |
| 5,080,456 * | 1/1992 | Katz et al. | 235/472.02 |
| 5,086,215 * | 2/1992 | Casner et al. | 235/462.01 |
| 5,196,683 * | 3/1993 | Marom et al. | 235/462.01 |
| 5,227,617 * | 7/1993 | Christopher et al. | 235/432 |
| 5,270,524 * | 12/1993 | Ouchi | 235/436 |
| 5,313,886 | 5/1994 | Müller | 101/486 |
| 5,321,436 | 6/1994 | Herbert | 346/140 R |
| 5,329,466 | 7/1994 | Monney | 364/559 |
| 5,408,080 * | 4/1995 | Zazzu et al. | 235/472.01 |
| 5,616,908 * | 4/1997 | Wilz et al. | 235/462.01 |
| 5,729,001 * | 3/1998 | Spitz | 235/456 |

\* cited by examiner

Primary Examiner—Thien M. Le
Assistant Examiner—Daniel St.Cyr
(74) Attorney, Agent, or Firm—Roberts & Mercanti, LLP

(57) ABSTRACT

An apparatus for inspecting the print quality of a series of barcodes positioned on at least one side of a high speed moving web. The apparatus includes a synchronization element having a light source and a photocell; a laser scanning element; a microprocessor, and means for generating decoded barcode data. Also included is a means for comparing the contrast value of the print on either side of the web material, whether black or multicolored. The apparatus includes an objective means of inspecting print quality which is more efficient than subjective means of visual inspection. If erroneous scanned data is found, the web is stopped until the problem is corrected.

20 Claims, 2 Drawing Sheets

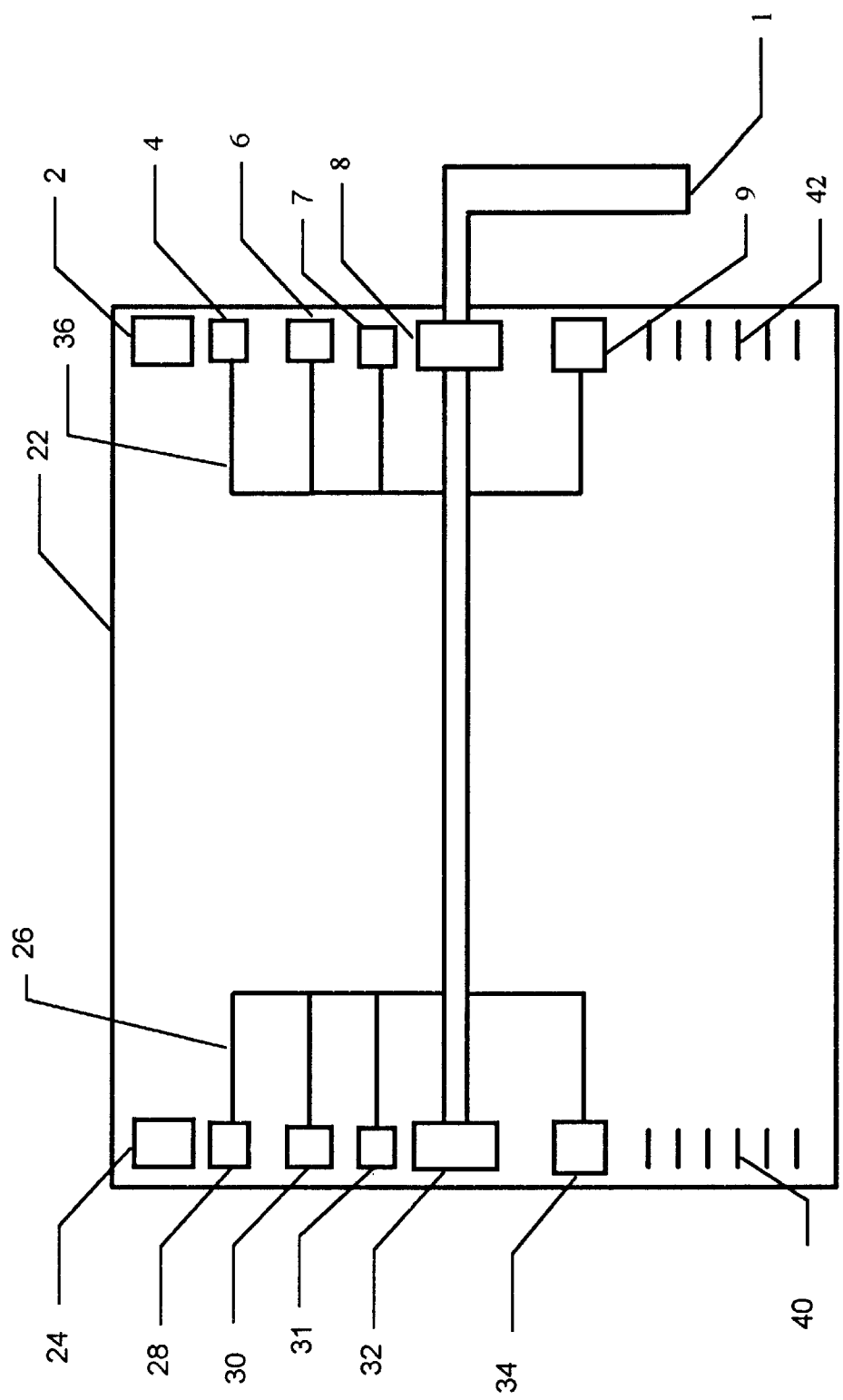

APPARATUS FOR INSPECTING PRINT QUALITY OF BARCODES ON A HIGH SPEED MOVING WEB

BACKGROUND OF THE INVENTION

1. Field of the Invention

The present invention relates to an apparatus for inspecting the print quality of a series of barcodes positioned on a high speed moving web.

2. Description of the Prior Art

It is well known in the art of printing that the quality of the print on a moving web declines with prolonged use of the printing machine. Therefore, it is necessary to monitor the quality of the print to maintain high quality output. Present methods of inspection are done subjectively by human workers at scheduled intervals. This method requires visual inspection of print quality and thus is inaccurate and very expensive. This is inaccurate because it is very difficult for the human eye to recognize subtle differences in contrast value, especially when the web is moving at high speeds. Further, the inspections must be done in scheduled intervals, therefore a problem is not recognized when it first occurs, but rather when it is first noticed. Nor is this method is cost efficient, because it requires the use of an inspector to exercise subjective judgment to monitor the print quality on the web.

Various apparatus are known in the art to print and scan images on a given material. One such apparatus, as taught in U.S. Pat. No. 5,321,436, discloses a franking machine which implements barcode printing and reading on individual mail items. This apparatus scans barcodes, yet there is no pre-sensing and trigger of a scanner which senses the quality of the barcode. Further, this apparatus is utilized for scanning barcodes on individual mail items, rather than barcodes on a continuous moving web. One known method of inspecting the surface of a continuously moving web is found in U.S. Pat. No. 4,868,403. This method involves scanning the web with a scanning beam to detect surface defects. This system, however, has no barcode reading feature. Another known method of inspecting the surface of a continuously moving web is found in U.S. Pat. No. 4,683,380. This involves an apparatus for detecting perforations, rather than barcodes, on a web material.

A much more reliable and cost effective method of inspection is provided by this invention which uses an apparatus which scans for the presence of a barcode, deciphers the barcode data when recognized, and objectively monitors acceptable print quality of the barcodes on a continuously moving high speed web. The apparatus includes a synchronization element comprising a light source which emits incident light on a barcode position, and a photocell which monitors reflected light from the barcode or barcode marker. The synchronization element triggers the laser scanning element to read the barcode and decode scanned barcode data and checks it for validity. A microprocessor receives the barcode position data and instructs the laser scanning element to receive and decode scanned data and present the decoded data. In addition, a contrast sensor is employed which determines the print contrast of either black or color print as compared to the web background. The contrast of the print can be compared either to the background of the web material, to print on the opposite face of the printed web material, or to print on another location on the web material. If an erroneous print quality value or contrast value at a threshold amount is indicated, the apparatus stops the web until the problem is corrected.

SUMMARY OF THE INVENTION

This invention provides an apparatus for inspecting the print quality of a series of barcodes positioned on at least one side of a high speed moving web comprising:

(a) a synchronization element comprising:
   i) a light source which emits a continuous light beam onto a barcode position or barcode marker position; and
   ii) a photocell which continuously monitors reflected light from a barcode or barcode marker;
(b) a laser scanning element capable of receiving and decoding scanned barcode data;
(c) a microprocessor which receives a barcode position signal from the synchronization element and generates a signal instructing the laser scanning element to receive and decode scanned barcode data; and
(d) means for generating decoded barcode data.

BRIEF DESCRIPTION OF THE DRAWINGS

FIG. 2 illustrates a schematic top view of the apparatus showing a synchronization element and a laser scanning element on both the left and right sides of the web.

DETAILED DESCRIPTION OF THE PREFERRED EMBODIMENT

Figure 1:
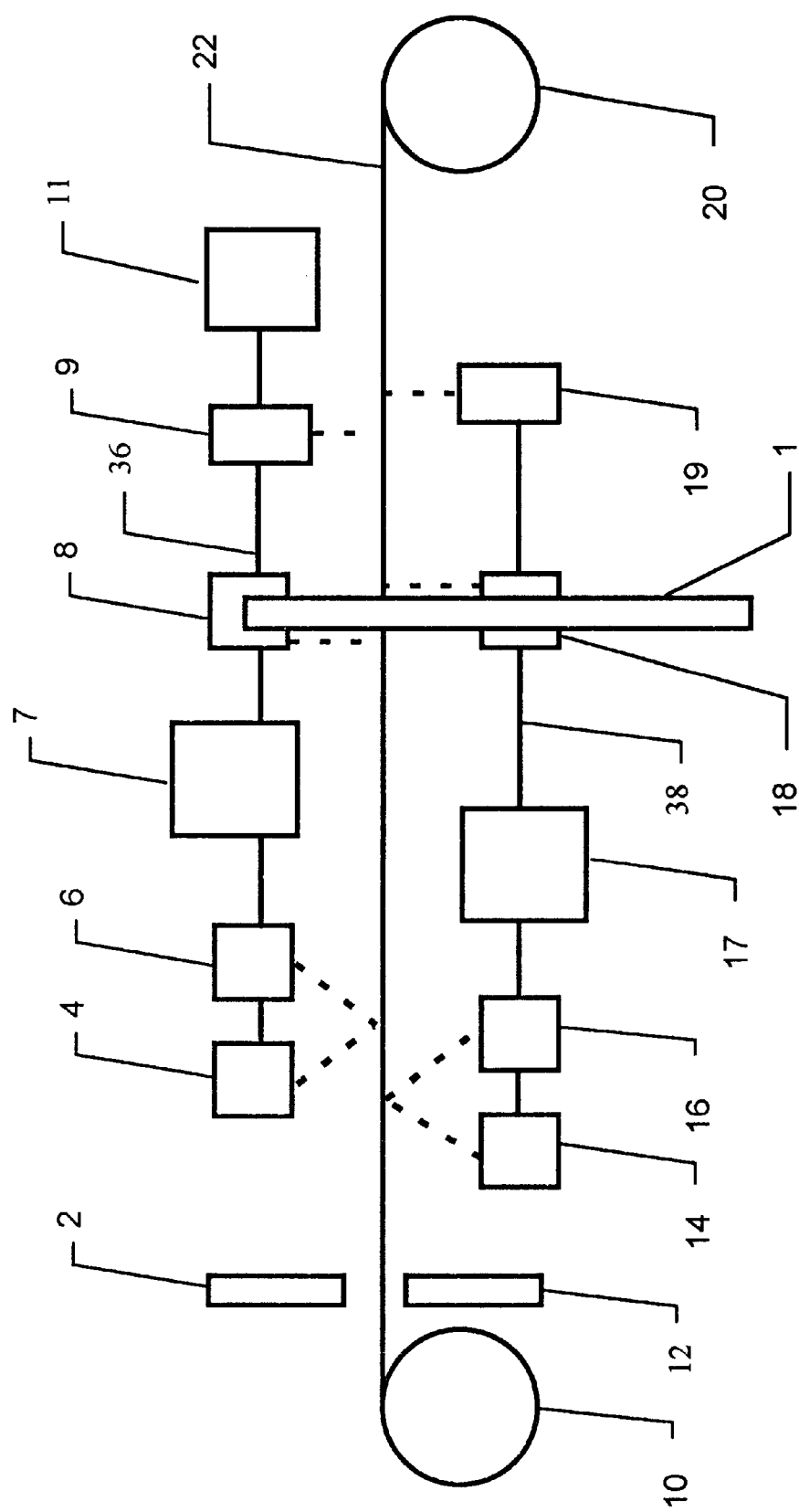
FIG. 1 illustrates a schematic side view of the apparatus showing a barcode printer, a synchronization element and a laser scanning element on both the top and bottom of the web.

The invention provides an apparatus for inspecting print quality of barcodes on a high speed moving web.

FIG. 1 shows a schematic side view of the apparatus wherein a web of material 22 moves transversely from roller 10 to roller 20. In the process, the web of material first moves from roller 10 through printer 2 on the upper face of the web and through printer 12 on the under face of the web. Printers 2 and 12 print barcodes or barcode markers on both faces of the web. The web is then passed through a synchronization element comprising light source 4 and photocell 6 on the upper face, and preferably synchronization element comprising light source 14 and photocell 16 on the under face, as shown in the FIG. 1. Suitable synchronization elements may be purchased as a model SM312CV mini-beam sensor from Banner Engineering Corp. located in Minneapolis, Minn. The synchronization elements begin the inspection process by signaling to laser scanning elements 8 and 18 whether a barcode or barcode marker is present. Light sources 4 and 14 emit a continuous light beam onto a barcode position or barcode marker position and photocells 6 and 16 continuously monitor reflected light from the barcode or barcode marker. Microprocessors 7 and 17 receive the barcode position signal data from the synchronization elements and generate a signal instructing laser scanning elements 8 and 18 to scan the identified barcode and decode scanned barcode data. If no code is read or if the signal is not readable, the printing will be determined to be erroneous. Suitable microprocessors are commercially available as a model Micro$^3$ CPU from IDEC, located in Sunnyvale, Calif. The laser scanning elements 8 and 18 are programmed to stop after a specified number of errors are detected, or if no bar code is read after about a desired timeframes. Suitable laser scanning elements may be purchased as a Model 20 barcode scanner from Accu-Sort Systems, Inc. located in Telford, Pa. In the preferred embodiment, the web is stopped after from about 0.1 to about 5 seconds, preferably from about 0.200 to about 1 second after error detection. In one preferred embodiment, the web 22 is divided into a series of 8.5 inch long forms and travels at a speed of 33 inches per second. Thus each form would take about 0.263 seconds to pass through said laser scanning elements 8 and 18.

Contrast sensors 9 and 19 are provided to sense the contrast between the print and the background web material. Sensors 9 and 19 can evaluate the contrast of either black or multicolored print. Additionally, sensors 9 and 19 may be used to compare the print density of the upper face of the web to the print density of the under face of the web. In case of a discrepancy in contrast value between the two faces, or if the determined contrast value indicated a threshold amount, the web would be stopped. It would then be restarted manually once all problems are corrected. Suitable color recognition sensors are commercially available as a SAIJ Full Color Recognition Sensor from IDEC, located in Sunnyvale, Calif. Display means 11 is used in conjunction with all utilized microprocessors and generates decoded barcode data in a readable form to be evaluated. The apparatus and all its component parts are supported by stand 1 and extension supports 26, 36, and 38 as shown in FIGS. 1 and 2.

FIG. 2 shows a schematic overhead view of the apparatus wherein the web of material 22 is moving transversely from the top to the bottom of the figure. In one preferred embodiment, the apparatus of the invention is installed at four separate locations on the web; one on each the upper face and under face as seen in FIG. 1, and on opposite sides of each face, as displayed in FIG. 2. Only one inspection status display means 11, however, need be used in the completed assembly. In this embodiment, the web 22 consists of two sets of forms, labeled 40 and 42. Printers 2 and 24 print barcodes or barcode markers on both sides of the web. The web is then passed through synchronization elements comprising light source 4 and photocell 6 on one side, and light source 28 and photo cell 30 on the other, as shown in the figure. The synchronization elements signal to laser scanning elements 8 and 32 if a barcode or barcode marker is present. Light sources 4 and 28 emit a continuous light beam onto a barcode position or barcode marker position and photocells 6 and 30 continuously monitor reflected light from the barcode or barcode marker. Microprocessors 7 and 31 are conveniently placed near the synchronization elements and laser scanning elements 8 and 32. They receive the barcode position signal from the synchronization elements and generate a signal instructing laser scanning elements 8 and 32 to receive and decode scanned barcode data if any is present. If no code is read or if the signal is not readable, an error will be noted. The laser scanning elements 8 and 42 are programmed to stop after a specified number of errors are detected, or if no bar code is read after a predetermined time. Contrast sensors 9 and 34 sense the contrast between the print and the background web material. Sensors 9 and 34 can evaluate the contrast of either black or multicolored print. If any erroneous print value is detected the web would be stopped and then restarted manually once all problems are corrected.

What is claimed is:

1. An apparatus for inspecting the print quality of a series of barcodes positioned on at least one side of a high speed moving web comprising:
   (a) a synchronization element comprising:
      i) a light source which emits a continuous light beam onto a barcode position or barcode marker position on the high speed moving web; and
      ii) a photocell which continuously monitors reflected light from the barcode or barcode marker position;
   (b) a laser scanning element for receiving and decoding scanned barcode data;
   (c) a microprocessor which receives a barcode position signal from the synchronization element and generates a signal instructing the laser scanning element to receive and decode scanned barcode data; and
   (d) means for generating decoded barcode data.

2. The apparatus of claim 1 further comprising:
   (e) a second synchronization element comprising:
      i) a light source which emits a continuous light beam onto a second barcode position or barcode marker position; and
      ii) a photocell which continuously monitors reflected light from the second barcode or barcode marker;
   (f) a second laser scanning element capable of receiving and decoding scanned barcode data from the second barcode or barcode marker; and wherein the microprocessor further receives a barcode position signal from the second synchronization element and generates a second signal instructing the second laser scanning element to receive and decode second scanned barcode data; and
   (g) means for generating second decoded barcode data.

3. The apparatus of claim 2 further comprising means for stopping the web when the decoded barcode data indicates an erroneous value.

4. The apparatus of claim 1 further comprising means for sensing and determining a value of the print contrast on at least one side of the moving web.

5. The apparatus of claim 4 further comprising means for stopping the web when the determined contrast value indicates a threshold amount.

6. The apparatus of claim 1 further comprising means for sensing and determining a value of the print contrast on two sides of the moving web and calculating a difference between the two print contrast values.

7. The apparatus of claim 6 further comprising means for stopping the web when the calculated difference in contrast values indicates a threshold amount difference.

8. The apparatus of claim 1 further comprising means for stopping the web when the decoded barcode data indicates an erroneous value.

9. The apparatus of claim 1 further comprising means for stopping the web after about 0.1 to about 5 seconds when erroneous barcode data is determined.

10. The apparatus of claim 1 further comprising means for printing barcodes on the web material.

11. An apparatus for inspecting the print quality of a series of barcodes positioned on at least two spaced portions of one face of a high speed moving web comprising:
    (a) first and second synchronization spaced apart elements each comprising:
       i) a light source which emits a continuous light beam onto barcode positions or barcode marker positions on the high speed moving web; and
       ii) a photocell which continuously monitors reflected light from the barcode or barcode marker positions;
    (b) first and second laser scanning elements for receiving and decoding scanned barcode data;
    (c) a microprocessor which receives a barcode position signal from the synchronization elements and generates signals instructing the laser scanning elements to receive and decode scanned barcode data; and
    (d) means for generating first and second decoded barcode data.

12. The apparatus of claim 11 further comprising means for inspecting the print quality of a series of barcodes positioned on at least two spaced portions of a second face of the high speed moving web comprising:
  (e) third and fourth synchronization elements each comprising:
    i) a light source which emits a continuous light beam onto barcode positions or barcode marker positions; and
    ii) a photocell which continuously monitors reflected light from the barcode positions or barcode marker positions;
  (f) a third and fourth laser scanning elements capable of receiving and decoding scanned barcode data from the barcodes or barcode markers; and wherein the microprocessor further receives a barcode position signal from the third and fourth laser synchronization element and generates a signal instructing the third and fourth laser scanning elements to, receive and decode second scanned barcode data; and
  (g) means for generating third and fourth laser decoded barcode data.

13. The apparatus of claim 12 further comprising means for stopping the web when the decoded barcode data indicates an erroneous value.

14. The apparatus of claim 11 further comprising means for sensing and determining a value of the print contrast on both side of the moving web.

15. The apparatus of claim 11 further comprising means for sensing and determining a value of the print contrast on two sides of the moving web and calculating a difference between the two print contrast values.

16. The apparatus of claim 11 further comprising means for stopping the web when the decoded barcode data indicates an erroneous value.

17. The apparatus of claim 11 further comprising means for stopping the web when the determined contrast value indicates a threshold amount.

18. The apparatus of claim 15 further comprising means for stopping the web when the calculated difference in contrast values indicates a threshold amount difference.

19. The apparatus of claim 11 further comprising means for stopping the web after about 0.1 to about 5 seconds when erroneous barcode data is determined.

20. The apparatus of claim 11 further comprising means for printing barcodes on the web material.

* * * * *